(12) United States Patent
Saitou

(10) Patent No.: US 9,358,634 B2
(45) Date of Patent: Jun. 7, 2016

(54) FRICTION STIR WELDING APPARATUS

(71) Applicant: F-TECH INC., Kuki, Saitama (JP)

(72) Inventor: Tomoya Saitou, Haga-gun (JP)

(73) Assignee: F-TECH INC., Saitama (JP)

(*) Notice: Subject to any disclaimer, the term of this patent is extended or adjusted under 35 U.S.C. 154(b) by 78 days.

(21) Appl. No.: 13/952,818

(22) Filed: Jul. 29, 2013

(65) Prior Publication Data

US 2014/0034706 A1 Feb. 6, 2014

(30) Foreign Application Priority Data

Aug. 2, 2012 (JP) ................... 2012-171702

(51) Int. Cl.
*B23K 20/12* (2006.01)

(52) U.S. Cl.
CPC ......... *B23K 20/1245* (2013.01); *B23K 20/1255* (2013.01); *B23K 2203/10* (2013.01)

(58) Field of Classification Search
None
See application file for complete search history.

(56) References Cited

U.S. PATENT DOCUMENTS

| | | | | |
|---|---|---|---|---|
| 6,299,050 | B1* | 10/2001 | Okamura et al. ........ | 228/110.1 |
| 8,814,027 | B2 | 8/2014 | Hori et al. | |
| 8,950,650 | B2* | 2/2015 | Okada et al. ............. | 228/102 |
| 2002/0145031 | A1* | 10/2002 | Hirano et al. ............ | 228/112.1 |
| 2012/0193401 | A1 | 8/2012 | Hori et al. | |
| 2012/0267419 | A1* | 10/2012 | Blaski et al. ............. | 228/2.1 |
| 2013/0098526 | A1* | 4/2013 | Kato ....................... | 156/64 |
| 2013/0112736 | A1* | 5/2013 | Kato ....................... | 228/112.1 |

FOREIGN PATENT DOCUMENTS

| | | |
|---|---|---|
| CN | 102574239 A | 7/2012 |
| JP | 2006-015351 A | 1/2006 |
| JP | 2007-125598 A | 5/2007 |
| JP | 4630172 B2 | 2/2011 |
| JP | 2011-079031 A | 4/2011 |
| JP | 2011-206786 A | 10/2011 |
| JP | 5304583 B2 | 10/2013 |
| WO | 2011/043127 A1 | 4/2011 |

OTHER PUBLICATIONS

Office Action dated Mar. 19, 2015, issued in corresponding Chinese Patent Application No. 201310331715.0 with English translation (11 pages).
Japanese Office Action dated Mar. 30, 2016, issued in Japanese Application No. 2012-171702 (5 pages).

* cited by examiner

*Primary Examiner* — Devang R Patel
(74) *Attorney, Agent, or Firm* — Westerman, Hattori, Daniels & Adrian, LLP

(57) ABSTRACT

A friction stir welding apparatus has a probe rotatable and vertically movable with respect to a processing target member, a welding tool having an interposed member that covers a part of an outer periphery of the probe and is rotatable relative to the probe, a mounting member on which the processing target member is mounted, a movement mechanism having an arm fitted with the welding tool that can move the welding tool with respect to the processing target member by moving the arm, and a correction mechanism having a correction member that can correct a moving direction of the welding tool so as to be matched with a predetermined processing direction, by bringing the interposed member into contact with the processing target member when the welding tool is moved with respect to the processing target member by moving the arm, and fixed to the mounting member.

5 Claims, 3 Drawing Sheets

FRICTION STIR WELDING APPARATUS

BACKGROUND OF THE INVENTION

The present invention relates to a friction stir welding apparatus, and more particularly relates to a friction stir welding apparatus that can weld a processing target member accurately along a predetermined processing direction.

In recent years, there has been proposed a friction stir welding apparatus that performs friction stirs on a predetermined portion to be welded in a processing target component formed by a plurality of metal plates such as aluminum plates by a probe rotating at a high speed to weld the metal plates with each other. Even in a strength component of a movable body such as an automobile, a configuration having a welding portion welded by a friction stir welding apparatus has been realized.

In such a friction stir welding apparatus, the probe and the processing target component need to be moved relative to each other to weld a predetermined portion to be welded accurately. Accordingly, it is important to move the probe and the processing target component relative to each other accurately without unnecessarily causing relative displacement therebetween.

Under such circumstances, Japanese Patent Application Laid-open Publication No. 2011-206786 discloses a friction stir welding tool in which a friction stirring rotor 10 is fitted to a hole 20A of a friction stirring stator 20 having guide portions 21 and 22 so that a friction stirring probe 11 is exposed. More specifically, there is disclosed such a configuration in which when a pair of members to be welded S1 is to be friction stir welded, the friction stir welding tool is moved while press-fitting the friction stirring probe 11 toward a contact portion of the members to be welded S1 and stirring the friction stirring probe 11, in a state where the guide portions 21 and 22 of the friction stirring stator 20 are brought into contact with the members to be welded S1 fixed by using a jig, to weld the contact portion, thereby obtaining a welded member S3.

SUMMARY OF THE INVENTION

However, according to studies made by the present inventors, in Japanese Patent Application Laid-open Publication No. 2011-206786, it is intended to move the friction stir welding tool and the member to be welded relative to each other accurately. However, because the friction stir welding tool needs to include the friction stirring stator having the guide portions, the configuration itself of the friction stir welding tool becomes complicated.

With this configuration, when the shape of a portion to be welded is changed, the shape of the guide portions of the friction stirring stator needs to be changed corresponding thereto. Therefore, it can be hardly said that a configuration for easily performing friction stir welding according to various shapes of the portion to be welded is realized.

With this configuration, because a part of the friction stirring probe comes in contact with a rear surface of the guide portion of the friction stirring stator and rotates, a lubricating film and a hard alloy layer need to be added to the contact portion, thereby making the configuration itself of the friction stir welding tool complicated.

Furthermore, the configuration can be applied in a limited manner to a case where the contact portions of the pair of plate members are friction stir welded to form a fillet portion, and is not a scalable configuration that can perform friction stir welding with respect to a portion to be welded in other configurations.

Therefore, under present circumstances, a friction stir welding apparatus having a new configuration that is simple, has high application scalability, and can weld a processing target member accurately along a predetermined processing direction has been desired.

The present invention has been achieved in order to solve the above problems, and an object of the present invention is to provide a friction stir welding apparatus that has a simple configuration and high application scalability, and can weld a processing target member accurately along a predetermined processing direction while eliminating unnecessary displacement of the welding tool.

To achieve the above object, a first aspect of the present invention is to provide a friction stir welding apparatus comprising a probe that is movable in a vertical direction with respect to a processing-target side surface of a processing target member and is rotatable relative to the processing target member, a welding tool having an interposed member that covers a part of an outer periphery of the probe and is rotatable relative to the probe, a mounting member on which the processing target member is mounted, a movement mechanism having an arm fitted with the welding tool that can move the welding tool with respect to the processing target member by moving the arm, and a correction mechanism having a correction member that can correct a moving direction of the welding tool so as to be matched with a predetermined processing direction, by bringing the interposed member into contact with the processing target member when the welding tool is moved with respect to the processing target member by moving the arm, and fixed to the mounting member.

According to a second aspect of the present invention, in addition to the first aspect, the correction member has a contact surface parallel to the predetermined processing direction, and is arranged on a predetermined side with respect to the predetermined processing direction on the processing-target side surface, corresponding to a rotation direction of the probe with respect to the processing-target side surface, and the interposed member is a bearing and the moving direction of the welding tool is corrected by bringing the bearing into contact with the contact surface. The explanation that the correction member is arranged on a predetermined side with respect to the predetermined processing direction on the processing-target side surface, corresponding to a rotation direction of the probe with respect to the processing-target side surface, has the following meaning. That is, when a rotation direction of the probe is clockwise with respect to the processing-target side surface, the correction member is arranged on the left side with respect to the predetermined processing direction on the processing-target side surface, and when the rotation direction of the probe is counterclockwise with respect to the processing-target side surface, the correction member is arranged on the right side with respect to the predetermined processing direction on the processing-target side surface.

According to a third aspect of the present invention, in addition to the first or second aspect, the correction member can advance and retract with respect to the processing target member.

According to a fourth aspect of the present invention, in addition to any of the first to third aspects, the movement mechanism is an industrial robot.

According to a fifth aspect of the present invention, in addition to any of the first to fourth aspects, the friction stir welding apparatus further comprises an auxiliary support mechanism that supports the mounting member by a support member and auxiliary supports only a vertical position of the processing target member, wherein the auxiliary support mechanism is fitted to the arm.

According to the configuration in the first aspect of the present invention, when the welding tool is moved with respect to the processing target member, which is fixed to the mounting member, by moving the arm of the movement mechanism, the interposed member that covers a part of the outer periphery of the probe and is rotatable relative to the probe comes in contact with the correction member of the correction mechanism fixed to the mounting member, to correct the moving direction of the welding tool so as to be matched with the predetermined processing direction. Accordingly, the processing target member can be welded accurately along the predetermined processing direction while eliminating unnecessary displacement of the welding tool with a simple configuration having high application scalability.

According to the configuration in the second aspect of the present invention, the correction member has the contact surface parallel to the predetermined processing direction, and is arranged on the predetermined side with respect to the predetermined processing direction on the processing-target side surface, corresponding to the rotation direction of the probe with respect to the processing-target side surface, and the interposed member is a bearing and the moving direction of the welding tool is corrected by bringing the bearing into contact with the contact surface. Accordingly, the processing target member can be welded more accurately along the predetermined processing direction while eliminating unnecessary displacement of the welding tool with a simpler configuration having high application scalability.

According to the configuration in the third aspect of the present invention, the correction member can advance and retract with respect to the processing target member. Therefore, when the welding tool is moved with respect to the processing target member by moving the arm of the movement mechanism, the interposed member and the correction member can be brought into contact with each other more appropriately. Furthermore, when the processing target member is mounted on the mounting member or when the probe is brought down toward the processing target member, it can be avoided that the correction member unnecessarily interferes with the mounted processing target member or the probe being brought down. Accordingly, the processing target member can be welded more accurately along the predetermined processing direction, with a simpler configuration.

According to the configuration in the fourth aspect of the present invention, because the movement mechanism is an industrial robot, a friction stir welding apparatus that can weld the processing target member more accurately along the predetermined processing direction with a more versatile configuration can be realized.

According to the configuration in the fifth aspect of the present invention, by providing the auxiliary support mechanism fitted on the arm so as to support the mounting member by a support member and auxiliary support only the vertical position of the processing target member, the probe and the processing target member can be positioned more accurately, and the processing target member can be welded more accurately along the predetermined processing direction.

DETAILED DESCRIPTION OF THE PREFERRED EMBODIMENT

Figure 1:
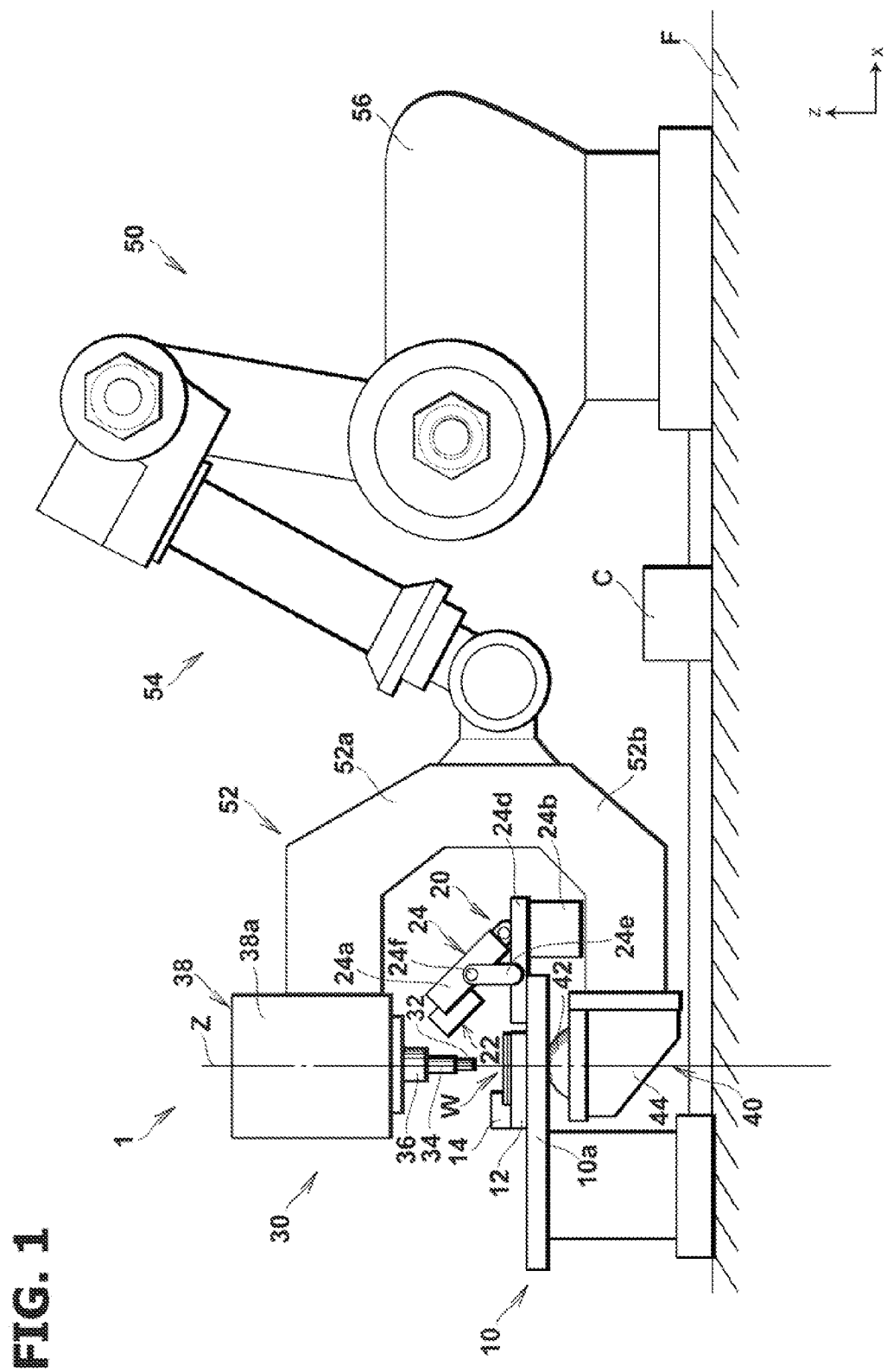
FIG. 1 is a side view showing an entire configuration of a friction stir welding apparatus according to an embodiment of the present invention.

A friction stir welding apparatus according to an embodiment of the present invention is explained in detail below with reference to the accompanying drawings. In the drawings, an x-axis, a y-axis, and a z-axis form three-axis orthogonal coordinates. A plane formed by the x-axis and the y-axis is parallel to a horizontal plane, and a normal direction of the z-axis is an upward direction.

Figure 2:
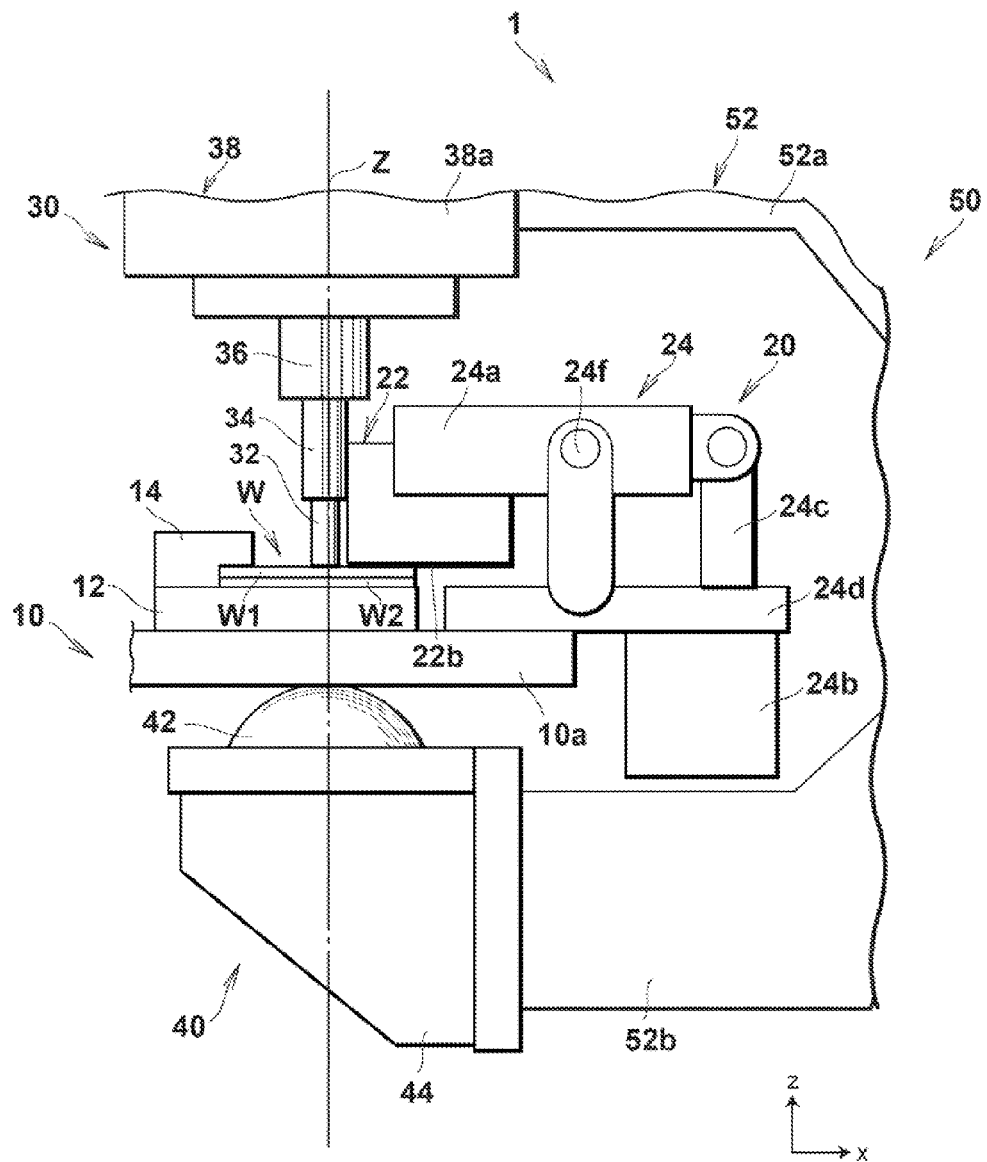
FIG. 2 is a partially enlarged side view of the friction stir welding apparatus according to the present embodiment.
Figure 3:
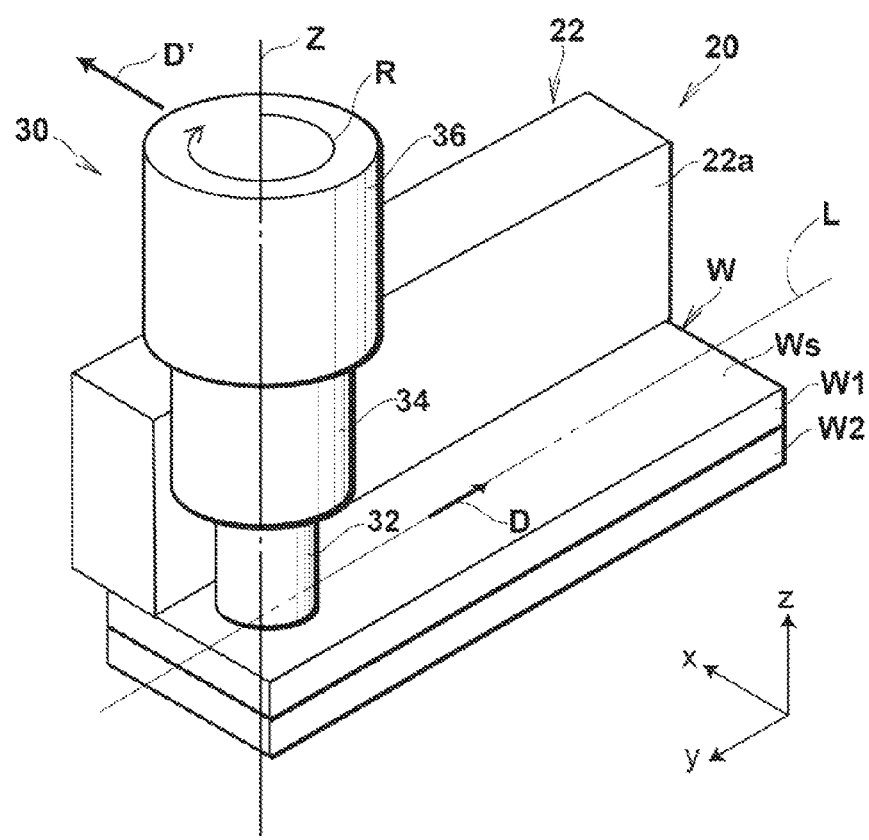
FIG. 3 is a partially enlarged perspective view of the friction stir welding apparatus according to the present embodiment.

FIG. 1 is a side view showing an entire configuration of the friction stir welding apparatus according to the present embodiment. FIG. 2 is a partially enlarged side view of the friction stir welding apparatus according to the present embodiment. FIG. 3 is a partially enlarged perspective view of the friction stir welding apparatus according to the present embodiment.

As shown in FIGS. 1 to 3, a friction stir welding apparatus 1 includes a mounting table 10 fixedly installed on a floor F so that a processing target member W is mounted thereon, a correction mechanism 20 arranged on the mounting table 10, a welding tool 30 that can be arranged opposite to the mounting table 10 above the mounting table 10, an auxiliary support mechanism 40 that can be arranged so as to come in contact with a lower face of the mounting table 10 below the mounting table 10, and a robot 50 fixedly installed on the floor F so as to support the welding tool 30 and the auxiliary support mechanism 40.

Specifically, the mounting table 10 is a mounting member including a mounting jig 12 that mounts the processing target member W on a mounting portion 10a thereof, and a stopper 14 arranged on the mounting jig 12 to detachably fix the processing target member W. The processing target member W is typically a plate member made of metal such as an aluminum material, in which a first member W1 and a second member W2 are juxtaposed in a vertical direction and respectively have an overlapped portion with each other. Predetermined portion of the overlapped area of the first member W1 and the second member W2 are welded along a predetermined weld line L by the welding tool 30 to be moved along a predetermined processing direction D. The position of the processing target member W on the mounting jig 12 is maintained accurately by holding a part of the processing target member W by the stopper 14. As a drive source that drives the stopper 14, a motor or an air cylinder can be mentioned. Needless to mention, the stopper 14 can be driven manually.

The correction mechanism 20 includes a correction member 22 and a drive mechanism 24 fixedly installed on the mounting portion 10a of the mounting table 10 so that the correction member 22 can be moved between an upper position and a lower position. The correction member 22 is typically a block member made of metal such as an iron material having sufficient strength and rigidity and has a contact surface 22a as one of external surfaces thereof. The contact surface 22a is a surface with which a bearing 34 of the welding tool 30 described later in detail comes in contact, and has a surface shape parallel to the predetermined processing direction D, that is, parallel to the predetermined weld line L to be obtained eventually. When the predetermined weld line L is a straight line, the surface shape is flat, and when the predetermined weld line L is a curved line, the surface shape is curved. The drive mechanism 24 includes a fitting member 24a to which the correction member 22 is fitted and fixed, a motor 24b that is dynamically connected to the fitting member 24a, a shaft 24c that couples the fitting member 24a and the motor 24b with each other, a base 24d fixedly installed on the mounting portion 10a of the mounting table 10, and a support plate 24e arranged upward in a standing manner from the base 24d.

In the correction mechanism 20, when the shaft 24c moves in the vertical direction by driving the motor 24b, the fitting member 24a fitted with the correction member 22 rotates around a rotating shaft 24f defined in the support plate 24e. Corresponding thereto, the correction member 22 can move between the upper position shown in FIG. 1 and the lower position shown in FIGS. 2 and 3 to advance and retract with respect to the processing target member W. A power source for moving the shaft 24c is not limited to the motor 24b, and an air cylinder or the like can be used instead.

The welding tool 30 includes a probe 32 that is typically a columnar member made of metal such as an iron material extending in the vertical direction and is rotatable around a central axis Z, which is parallel to the z-axis, and a bearing 34 that surrounds and is arranged around an upper part of an outer periphery of the probe 32, can be driven to rotate relative to the probe 32 around the probe 32 coaxially with the central axis Z, and is an interposed member that can be brought into contact with the contact surface 22a without transferring rotation force applied from the probe 32 to the contact surface 22a. The welding tool 30 further includes a holder 36 that holds the probe 32 and the bearing 34, and a drive mechanism 38 that vertically moves the probe 32 and the bearing 34 held by the holder 36 and causes the probe 32 to rotate around the central axis Z. The bearing 34 is typically a rolling bearing and has a configuration in which a plurality of balls or a plurality of rollers are rotatably held between an inner ring and an outer ring (both not shown). The inner ring is fitted to an upper part of the outer periphery of the probe 32 and the outer ring can be brought into contact with the contact surface 22a of the correction member 22. When the balls or the rollers can be rotatably held by one of the inner ring and the outer ring reliably, the other can be omitted. Needless to mention, as the bearing 34, various bearing configurations such as a slide bearing, a magnetic bearing, and a fluid bearing can be applied. The drive mechanism 38 includes a motor or a shaft (both not shown) and the like in a casing 38a.

In the welding tool 30, when the drive mechanism 38 moves the holder 36 that holds the probe 32 and the bearing 34 downward, a lower part of the probe 32 is press-fitted into the processing target member W, and can reach a position at which the probe 32 intrudes into the second member W2, passing through the first member W1 in the processing target member W. In such a case, even when the probe 32 is being rotated by the drive mechanism 38, the outer periphery of the bearing 34, that is, the outer ring thereof, or when the outer ring is omitted, the plurality of balls or rollers can come in contact with the contact surface 22a in a state separated from the rotation. An upper surface of the first member W1 of the processing target member W may be referred to as "processing-target side surface Ws" for convenience's sake.

When a rotation direction R of the probe 32 is clockwise with respect to the processing-target side surface Ws, the correction member 22 is arranged on the left side with respect to the predetermined processing direction D on the processing-target side surface Ws, and when the rotation direction R of the probe 32 is counterclockwise with respect to the processing-target side surface Ws, the correction member 22 is arranged on the right side with respect to the predetermined processing direction D on the processing-target side surface Ws. In FIG. 3, an example in which the correction member 22 is arranged on the left side with respect to the predetermined processing direction D on the processing-target side surface Ws is shown.

The auxiliary support mechanism 40 includes a support member 42 that is typically a ball made of metal such as an iron material and comes in contact with a lower surface of the mounting portion 10a of the mounting table 10 on an opposite side to the mounting jig 12, and a holder 44 that holds the support member 42 rotatably while maintaining the central position thereof immovable. In the auxiliary support mechanism 40, the support member 42 can support the mounting table 10 auxiliary while coming in contact with the lower surface of the mounting portion 10a of the mounting table 10 at one point in the upper part of the support member 42, in a state with the support member 42 facing a lower end of the probe 32, putting the processing target member W therebetween.

The robot 50 is a movement mechanism that can move the welding tool 30 and the processing target member W fixed on the mounting jig 12 of the mounting table 10 relative to each other, and is typically an industrial robot. Specifically, the robot 50 includes a fitting jig 52 in a two-pronged shape as seen from the side and having an upper fitting portion 52a and a lower fitting portion 52b, respectively, fitted with the welding tool 30 and the auxiliary support mechanism 40 correspondingly, an arm 54 fitted with the fitting jig 52, which is typically a manipulator having multiple joints, and a robot body 56 having a drive mechanism that moves the arm 54, an arithmetic processing unit, and a memory (all not shown) built therein. While the casing 38a of the drive mechanism 38 of the welding tool 30 is fitted and fixed to the upper fitting portion 52a of the fitting jig 52, the holder 44 of the auxiliary support mechanism 40 is fitted and fixed to the lower fitting portion 52b of the fitting jig 52. A connected portion of the upper fitting portion 52a and the lower fitting portion 52b in the fitting jig 52 is fitted to one end of the arm 54, and the robot body 56 is connected to the other end of the arm 54. By operating the drive mechanism of the robot body 56, the arm 54 moves, and corresponding thereto, the welding tool 30 and the auxiliary support mechanism 40 can be moved vertically and horizontally with multiple degrees of freedom while maintaining a relative positional relation between the welding tool 30 and the auxiliary support mechanism 40. Furthermore, when friction stir welding is performed on the processing target member W, the arm 54 moves the welding tool 30 and the auxiliary support mechanism 40 along the predetermined processing direction D.

Various constituent elements of the friction stir welding apparatus 1 are controlled appropriately upon reception of a control signal transmitted from a controller C, to operate so as to perform friction stir welding with respect to the processing target member W. Specifically, the controller C press-fits the probe 32 into the processing target member W by bringing down the welding tool 30 toward the processing target member W, and rotates the probe 32 while causing the bearing 34 to come in contact with the correction member 22, thereby stirring the processing target member W while generating frictional heat in the processing target member W by the probe 32. The controller C then moves the probe 32 and the processing target member W relative to each other by the arm 54 of the robot 50, in a state where the bearing 34 is followedly brought into contact with the correction member 22 while rotating the probe 32, to execute control to weld the processing target member W along the predetermined weld line L. The controller C has an arithmetic processing unit or a memory (both not shown) and the like built therein, and data and the like relating to a control program for performing friction stir welding and the predetermined processing direction D are stored in the memory.

A friction stir welding method for performing friction stir welding with respect to the processing target member W by using the friction stir welding apparatus 1 having the configuration described above is explained below in detail.

Before starting a series of processes of the friction stir welding method, as a preparation therefor, the welding tool 30 is fitted and fixed to the upper fitting portion 52a of the fitting jig 52, and the auxiliary support mechanism 40 is fitted and fixed to the lower fitting portion 52b of the fitting jig 52 in the robot 50.

Simultaneously therewith, after the processing target member W to which friction stir welding is to be performed is mounted on the mounting jig 12 of the mounting table 10, a part of the processing target member W is held by the stopper 14, thereby positioning and fixing the processing target member W.

The series of processes of the friction stir welding method is then started. In the series of processes, the controller C executes automatic control by using the control program and data stored in the memory in accordance therewith.

First, under control of the controller C, as shown in FIG. 1, the drive mechanism of the robot body 56 appropriately moves the arm 54 vertically and horizontally to arrange the probe 32 of the welding tool 30 fitted to the upper fitting portion 52a of the fitting jig 52 so as to face the processing target member W at a first predetermined position above the processing target member W, and brings the support member 42 of the auxiliary support mechanism 40 fitted to the lower fitting portion 52b of the fitting jig 52 into contact with the lower surface of the mounting portion 10a of the mounting table 10 at one point in the upper part of the support member 42 so as to face the lower part of the probe 32, putting the processing target member W therebetween. When the respective positions of the probe 32 and the support member 42 are realized, the drive mechanism of the robot body 56 stops the operation to fix the position of the arm 54 temporarily.

Once the position of the arm 54 is fixed in this manner, as shown in FIG. 2, the motor 24b of the correction mechanism 20 moves the shaft 24c upward so that the fitting member 24a is rotated around the rotating shaft 24f under control of the controller C, and corresponding thereto, the correction member 22 is rotated to move to the lower position. When the lower surface 22b of the correction member 22 comes in contact with the upper surface of the first member W1 of the processing target member W, the motor 24b is stopped to stop the movement of the shaft 24c, and the correction member 22 is maintained in a state with the lower surface 22b coming in contact with the upper surface of the first member W1. The process to bring the lower surface 22b of the correction member 22 into contact with the upper surface of the first member W1 of the processing target member W can be performed beforehand at the same timing with the process in which the stopper 14 grasps the processing target member W to position and fix the processing target member W.

When the correction member 22 is rotated to move to the lower position in this manner, as shown in FIG. 2, the drive mechanism 38 of the welding tool 30 moves the holder 36 that holds the probe 32 and the bearing 34 downward to bring the probe 32 downward under control of the controller C, so that the lower part of the probe 32 reaches a second predetermined position at which the probe 32 intrudes into the second member W2, passing through the first member W1 in the processing target member W. At this time, the outer periphery of the bearing 34 comes in contact with the contact surface 22a of the correction member 22. At this time, the drive mechanism 38 of the welding tool 30 can rotate the probe 32 via the holder 36 as required.

When the lower part of the probe 32 reaches the second predetermined position, as shown in FIG. 3, in a state where the drive mechanism 38 of the welding tool 30 is continuously rotating the probe 32 under control of the controller C, the drive mechanism of the robot body 56 moves the arm 54 so that the probe 32 and the support member 42 are moved in a moving direction, which is the predetermined processing direction D toward a negative direction of the y-axis, in a state with their positional correspondence relation being maintained. That is, at this time, the probe 32 is moved in the processing direction D while rotating in the clockwise rotation direction R when the central axis Z is seen from a negative direction of the z-axis, in a state where the lower part of the probe 32 intrudes into the second member W2, passing through the first member W1 in the processing target member W. As a result, the first member W1 and the second member W2 are friction stir welded, corresponding to a moved track of the lower part of the probe 32. Simultaneously, the support member 42 is moved in the predetermined processing direction D while rotating in the holder 44, in a state where the support member 42 comes in contact with the lower surface of the mounting portion 10a of the mounting table 10 at one point in the upper part of the support member 42, so as to face the lower part of the probe 32, putting the processing target member W therebetween.

Because the probe 32 rotates in the clockwise rotation direction R in a state with the probe 32 passing through the first member W1 and intruding into the second member W2, the probe 32 receives rotation reaction force D' from the first member W1 and the second member W2 to be displaced in the normal direction of the x-axis, and tends to deviate from the predetermined processing direction D. However, because the outer periphery of the bearing 34 comes in contact with the contact surface 22a of the correction member 22, the probe 32 is not displaced unnecessarily. Furthermore, because the contact surface 22a has a surface shape parallel to the predetermined processing direction D, that is, parallel to the predetermined weld line L, when the probe 32 is moved in the processing direction D while the bearing 34 comes in contact with the contact surface 22a, the moved track of the lower part of the probe 32 matches with the predetermined weld line L, and corresponding thereto, a welding portion that has been friction stir welded along the predetermined weld line L can be obtained in the first member W1 and the second member W2.

When the probe 32 and the like have been moved to a third predetermined position, which is an end point of a portion required to be friction stir welded, with the movement of the arm 54, the drive mechanism 38 of the welding tool 30 moves the probe 32 upward while maintaining the rotation of the probe 32, to pull out the probe 32 from the processing target member W under control of the controller C, and after having uplifted the probe 32 to the upper position thereof, stops the movement of the probe 32. The drive mechanism of the robot body 56 then moves the arm 54 so that the probe 32 and the support member 42 exit from the upper and lower areas of the processing target member W, and stops the movement of the arm 54.

When the probe 32 and the support member 42 have exited, the motor 24b of the correction mechanism 20 moves the shaft 24c downward under control of the controller C, to rotate the fitting member 24a around the rotating shaft 24f, and corresponding thereto, rotates the correction member 22 to move to the upper position, and stops the movement thereof after the correction member 22 exits from the upper area of the processing target member W.

Finally, when the processing target member W is released by detaching the stopper 14 and is dismounted from the mounting table 10, a processed product in which a predetermined portion to be welded is friction stir welded can be obtained.

With the above configuration, a configuration example in which the processing target member W is fixed to the mounting table 10, and the welding tool 30 and the auxiliary support mechanism 40 are movably fitted to the arm 54 of the robot 50 has been explained. However, in principle, it is only required that the processing target member W, the welding tool 30, and the auxiliary support mechanism 40 can be moved relative to each other. Therefore, alternatively, a configuration example in which the processing target member W can be fitted movably to the arm 54 of the robot 50, and the welding tool 30 and the auxiliary support mechanism 40 are fixed to the mounting table 10 can be also adopted. However, in this case, the interposed member, which is typically a bearing, is provided in the mounting jig 12 or the like on which the processing target member W is to be mounted.

In such a case, after the mounting jig 12 onto which the processing target member W, which is to be friction stir welded, is mounted and fixed is fitted to a fitting jig of the arm 54 of the robot 50, the probe 32 of the welding tool 30 fitted and fixed to the mounting table 10 is press-fitted into the processing target member W and stirred, the mounting jig 12 to which the processing target member W is fixed is moved by the arm 54 to perform friction stir welding with respect to the processing target member W, in a state where the support member 42 of the auxiliary support mechanism 40 fitted and fixed to the mounting table 10 comes in contact with the lower surface of the mounting jig 12 to which the processing target member W is fixed. At this time, the welding portion that has been friction stir welded along the predetermined weld line L can be obtained in the same manner by bringing the outer periphery of the bearing provided in the mounting jig 12 or the like, on which the processing target member W is to be mounted, into contact with the contact surface 22a of the correction member 22.

In the configuration described above, a configuration example in which the auxiliary support mechanism 40 is applied thereto has been explained. However, the auxiliary support mechanism 40 can be omitted in such a case that the required processing accuracy is relatively low.

In the present invention, the type, the arrangement, the number, and the like of the members are not limited to those in the embodiment explained above, and it is needless to mention that the constituent elements can be modified as appropriate without departing from the scope of the invention, such as appropriately replacing these elements by other ones having identical operational effects.

As described above, in the present invention, a friction stir welding apparatus that can accurately weld a processing target member along a predetermined processing direction while eliminating unnecessary displacement of the welding tool can be provided with a simple configuration having high application scalability. Therefore, because of its general purposes and universal characteristics, applications of the present invention can be expected in a wide range in the field of welding of a strength member of a movable body such as an automobile.

What is claimed is:

1. A friction stir welding apparatus comprising:
   a welding tool having a probe moving in a vertical direction with respect to a processing-target side surface of a processing target member and rotating around a central axis to rotate relative to the processing target member, and an interposed member covering a part of an outer periphery of the probe to rotate relative to the probe coaxially with the central axis;
   a mounting member on which the processing target member is mounted;
   a movement mechanism having an arm fitted with the welding tool to move the welding tool with respect to the processing target member by moving the arm; and
   a correction mechanism having a correction member that is a block member correcting a moving direction of the welding tool to be matched with a predetermined processing direction, by bringing the interposed member into contact with the correction member when the welding tool is moved with respect to the processing target member in the predetermined processing direction by moving the arm, the correction mechanism being fixed to the mounting member,
   wherein the predetermined processing direction intersects the vertical direction,
   wherein the correction member has a contact surface parallel to the predetermined processing direction,
   and wherein the correction member is arranged on a predetermined side with respect to the predetermined processing direction on the processing-target side surface, corresponding to a rotation direction of the probe with respect to the processing-target side surface, and the interposed member is a bearing and the moving direction of the welding tool is corrected by bringing the bearing into contact with the contact surface, with the probe and the bearing being moved relatively with respect to the correction member in the predetermined processing direction.

2. The friction stir welding apparatus according to claim 1, wherein the correction mechanism has a rotating shaft and the correction member rotates about the rotating shaft to advance and retract with respect to the processing target member.

3. The friction stir welding apparatus according to claim 1, wherein the movement mechanism is an industrial robot.

4. The friction stir welding apparatus according to claim 2, further comprising an auxiliary support mechanism supporting the mounting member by a support member, wherein the auxiliary support mechanism is fitted to the arm.

5. The friction stir welding apparatus according to claim 1, wherein the welding tool moves along the contact surface of the correction member in the predetermined processing direction.

* * * * *